Feb. 5, 1952            C. C. SMITH            2,584,818
LENS COUPLED RANGE FINDER FOR CAMERAS
Filed Nov. 18, 1946            5 Sheets-Sheet 1

Fig. 1

Inventor
Clarence C. Smith,
By
his Attorneys

Feb. 5, 1952 — C. C. SMITH — 2,584,818
LENS COUPLED RANGE FINDER FOR CAMERAS
Filed Nov. 18, 1946 — 5 Sheets-Sheet 2

Fig. 2

Inventor
Clarence C. Smith,
By Richard Shepard
His Attorneys

Feb. 5, 1952  C. C. SMITH  2,584,818
LENS COUPLED RANGE FINDER FOR CAMERAS
Filed Nov. 18, 1946  5 Sheets-Sheet 3

Inventor
Clarence C. Smith

Feb. 5, 1952     C. C. SMITH     2,584,818
LENS COUPLED RANGE FINDER FOR CAMERAS
Filed Nov. 18, 1946     5 Sheets-Sheet 4

Inventor
CLARENCE C. SMITH,
By Shepard & Shepard
his Attorneys

Feb. 5, 1952

C. C. SMITH 2,584,818

LENS COUPLED RANGE FINDER FOR CAMERAS

Filed Nov. 18, 1946

Inventor
CLARENCE C. SMITH,
By Shepard & Shepard
his Attorneys

Patented Feb. 5, 1952

2,584,818

UNITED STATES PATENT OFFICE 2,584,818

LENS COUPLED RANGE FINDER FOR CAMERAS

Clarence C. Smith, Flushing, N. Y., assignor of one-half to Eugene F. Hartley, Onancock, Va.

Application November 18, 1946, Serial No. 710,668

4 Claims. (Cl. 95—44)

This invention relates to photographic cameras and in particular to viewfinding and focusing operations.

Preparatory to making a photographic exposure, so far as I am aware, it is a common practice to determine or guess at the distance of the object from the camera and then focus the camera accordingly. After focusing the camera, the operator looks into the viewfinder and moves the camera until the object appears in the viewfinder and then the camera is tilted in various directions until the object has been satisfactorily framed in the viewfinder. The camera is then in condition for making an exposure, care being taken to maintain the object properly located in the viewfinder at the time of the exposure. If, in the meantime the distance from the camera to the object has changed, as when the object is moving, thus requiring a change in focus, the operator must shift his sight from the viewfinder to the focusing mechanism for changing the focus to meet the new conditions. While thus refocusing the camera, the latter may have been inadvertently moved to such an extent that the object will be located in an undesirable position in the viewfinder or it may not even appear in the viewfinder. It will then become necessary to again frame the object in the viewfinder. If the distance has again changed, then focusing and viewfinding will have to be repeated until a satisfactory condition of focus and view framing has been accomplished. Thus the desired poistioning of the image in the viewfinder and the subsequent focusing of the camera as commonly accomplished is a difficult, annoying and objectionable task.

The principal object of the present invention is to avoid the above mentioned objections and to provide for accurately and satisfactorily focusing the camera while continuing to look into the finder so as to maintain the image properly in the viewfinder. This is particularly important in photographing a moving subject as the camera box may be moved to follow the moving subject and thereby maintain the image in its desired position in the viewfinder while the focusing operation is being performed. In carrying out this feature of the invention, provision is made for utilizing sighting tubes for viewfinding, view framing and focusing purposes. Furthermore, provision is made for enabling the operator to look through a pair of sighting tubes for viewfinding and framing purposes, and to adjust the sighting tubes, while continuing to view the subject through said tubes, in such a manner as to focus the tubes on the subject and thereby move the lens of the camera and bring it into focus with respect to the subject to be photographed.

In other words, the present invention provides for viewfinding and/or framing and also focusing, without requiring the operator to shift his sight from one operation to the other, whereby the operator is enabled to maintain the image in the desired position in the viewfinder while focusing the camera.

Figure 1:
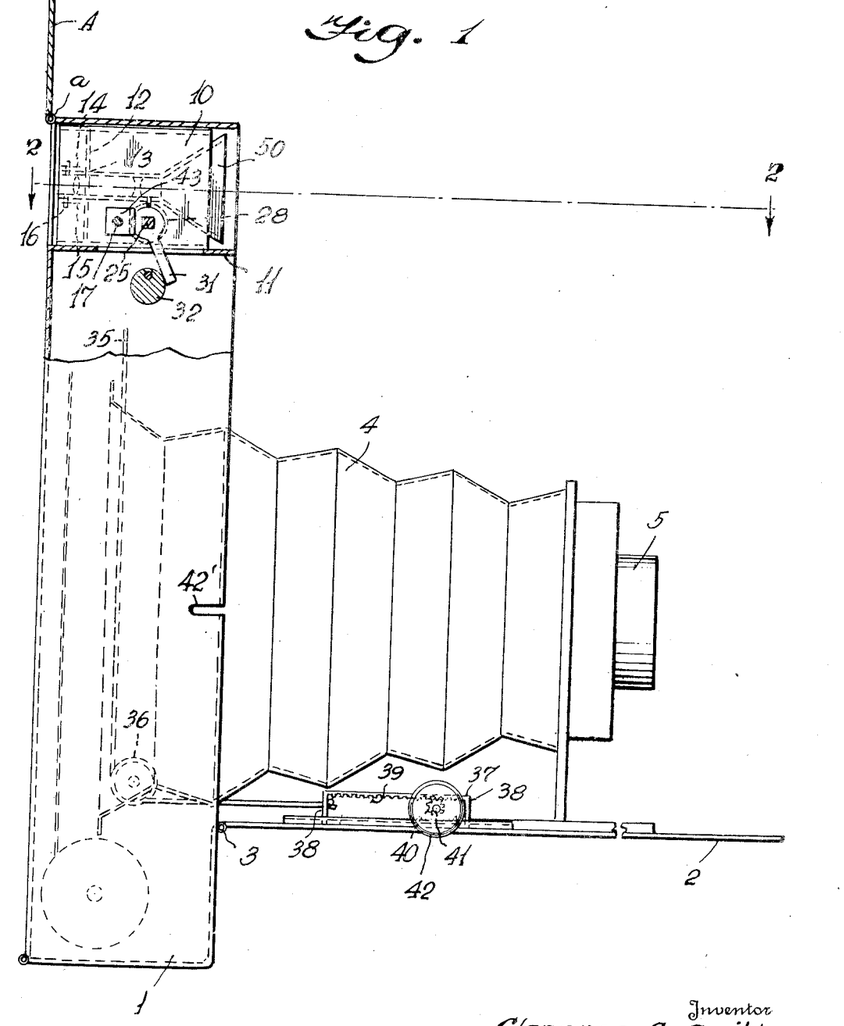
Figure 1 is a side view of an ordinary form of foldable hand camera, the front of the camera box being in open position and the bellows of the camera extended, the top portion of the adjacent side of the camera box being broken away to show some of the parts of the present invention.

For an understanding of the present invention, there has been shown, more particularly in Figure 1 of the drawings, the camera box or casing 1 of any ordinary or preferred form of folding hand camera. The reference character 2 designates the usual front of the camera box hinged or pivoted at its bottom edge as at 3, and shown in a horizontal open position in Figures 1 and 2 of the drawings. There is also the usual or preferred form of bellows 4 having suitable lens mechanism 5 at the front of the bellows. The lens mechanism and the front of the bellows are supported on the top side of the foldable front 2 of the camera box in the open position thereof and mounted to slide back and forth so that the bellows may be extended for exposure purposes and may also be collapsed into the camera box to permit of the upward folding of the front 2 into its closed position. These parts are common and well known and form no part of the present invention.

Figure 2:
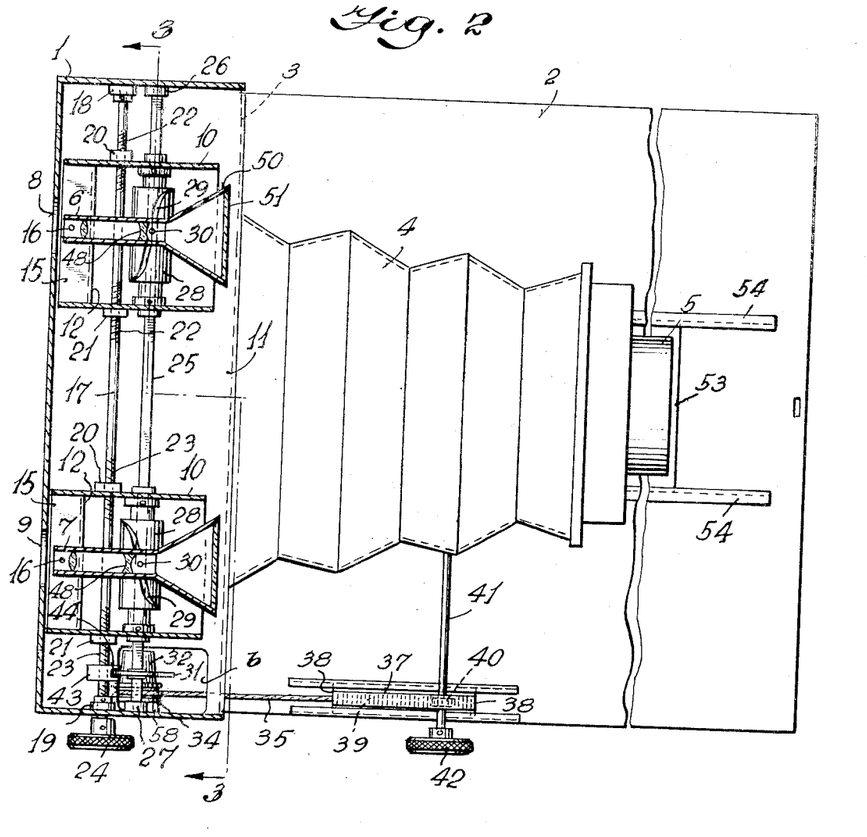
Figure 2 is a plan section on the line 2—2 of Figure 1.

In carrying out the present invention, two sighting tubes 6 and 7 are employed for viewfinding and framing and also for focusing purposes. These tubes are duplicates in construction and mounting and, in the present embodiment of the invention, are shown as disposed in the same horizontal plane above the bellows 4 and within the top portion of the camera box which has been extended upwardly so as to house and accommodate these sighting tubes. The back wall of the camera, as shown in Figure 2, may be provided with openings 8 and 9 in alignment with the rear ends of the respective tubes so that the operator may conveniently look through the tubes from the back of the camera. Another arrangement has been shown in Figure 1, wherein a section A of the camera box back may be hinged at its top edge, as at $a$, so that it may be swung upwardly to expose the rear end of the tubes 6 and 7 for viewing purposes. When in its upright open position, the part A functions as a shield to shield the eyes against light when looking through the viewing or sighting tubes. In order that the sighting tubes may be adjusted to the spacing of the eyes of any particular operator, provision is made for slidably moving the tubes towards and away from one another, and this feature of the invention will now be described.

Each sighting tube is mounted upon a carriage 10 in the form of a rectangular box or casing open at its front and rear ends and enclosing the sighting tube. Beneath the carriage is a horizontal shelf or partition 11 on which the carriages are mounted to slide transversely of the camera towards and away from one another. The back wall 12 of each carriage terminates short of the back wall of the camera box and is provided with a slot or opening 13 through which the rear end of the sighting tube projects. Horizontal flanges 14 and 15 project rearwardly at the top and bottom edges of the slot 13 and lie respectively above and below the tube, the latter being pivoted to swing horizontally upon a vertical axis afforded by suitable pivot connections 16 between the tube and the respective flanges. The forward end portion of the sighting tube is supported in a manner as will be hereinafter described.

For the purpose of adjustably moving the carriages 10, there is provided a horizontal shaft 17 extending through the side walls of the carriages and journaled as at 18 and 19 upon opposite upright side walls of the camera box. Each carriage is provided with nuts 20 and 21 fixed to the upright side walls of the carriage and receiving the shaft 17. This shaft is provided with screw threaded portions 22 for the nuts of one carriage and 23 for the nuts of the other carriage. The screw threads 23 are reversely arranged with respect to the screw threads 22 so that by turning the shaft 17, the carriages will be moved simultaneously in opposite directions for the purpose of adjusting the spaced relation of the carriages and likewise the sighting tubes. A suitable knob, finger piece or handle 24 is provided upon one end of the shaft 17 and at the outer side of the camera box for convenience in rotating the shaft 17, whereby an operator may turn the knob 24 and thereby shift the carriages and bring the tubes into registered alignment with the eyes of the operator. When the tubes have thus been set in accordance with the spacing of the eyes of the operator, a subsequent change in the spacing becomes necessary only when the camera is being used by another operator having an eye spacing different from that for which the sighting tubes were originally set. When the sighting tubes have been set in accordance with the spacing of the eyes of the operator, the latter may then look through the tubes with both eyes and the camera may be hand manipulated in the usual manner to bring the object to be photographed into view in the tubes. The camera box then should be hand manipulated to dispose or frame the image of the object correctly within the viewfinder afforded by the sighting tubes 6 and 7.

Finding of the proper focus for the lens mechanism is accomplished, in a manner hereinafter described; and is based on the well known method of range finding by triangulation. Here, the distance between the tubes, as set to the spacing of the eyes of the operator, is employed as the base of the triangle, while the tube sighting lines extending from the ends of such base to and intersecting on the object viewed through the tubes constitutes the other sides of the triangle. After adjustably spacing the sight tubes to the spacing of the operator's eyes, the tubes are swung or moved on their pivot points 16 so as to toe inwardly the front ends of the tubes until the longitudinal sight lines of the tubes intersect on the object to be photographed. An embodiment of means for accomplishing this result includes a horizontal shaft 25 disposed in front of the shaft 17 and journaled at its ends as at 26 and 27 on the inner faces of the opposite upright side walls of the camera box. This shaft extends loosely through the upright side walls of the carriages 20 so that the latter are permitted to slide back and forth on the shaft. This shaft also functions to prevent vertical swinging of the carriages on the shaft 17. Beneath each sighting tube there is provided on the shaft 25 a cylindrical member 28 which is mounted to slide longitudinally on the shaft but held thereto against rotation on the shaft preferably by having the shaft 25 non-circular in cross section, preferably square. The cylindrical part 28 is provided with an axial opening of the shape of the cross section of the shaft to receive the shaft, whereby the cylindrical part may rotate with the shaft and slide longitudinally thereon. The cylindrical member 28 is held to the carriage 10 in any suitable manner so that they will move together. The forward end portion of the sighting tube rests upon the top of the cylindrical part 28 and the latter is provided with a cam groove 29 in which travels a pin or projection 30 depending from the tube, so that when the shaft 25 is turned, the cylindrical part 28 will be likewise turned and the walls of the cam groove 29 wiping across the pin 30 will cause the sighting tube to be swung or turned upon its pivot pin 16. As best shown in Figure 2 of the drawings, it will be seen that the cam grooves 29 are reversely disposed whereby the tubes will be swung simultaneously and equally in opposite directions when the shaft 25 is turned.

Suitable provision is made for rotating the shaft 25, and one embodiment of such means has been shown in the drawings as including a crank arm 31, mounted upon the shaft 25 between one of the carriages 10 and the adjacent upright side wall of the camera box. This crank arm is mounted to slide on the shaft longitudinally thereof but is held thereto so as to rotate therewith. The crank arm 31 depends from the shaft 25, extends downwardly through an opening $b$ in the horizontal partition 11, and rests against the periphery of a cam 32 disposed below the shaft 25 and having its longitudinal axis parallel therewith. This cam is mounted to rotate on a horizontal axis and is rotatably supported at its outer end on a bearing 33 carried by the inner face of the adjacent upright side wall of the camera box. The cam 32 is tapered inwardly from the adjacent side of the camera box. For rotating the cam 32, the latter is provided at its outer end with a grooved pulley member 34 over which is trained a cord 35 having its upper end suitably secured to the pulley. This cord depends from the pulley and extends downwardly to another grooved pulley 36 rotatably supported within the camera box 1 adjacent and just above the level of the hinge connection 3 for the front of the camera box. The lower portion of the cord extends forwardly in a horizontal direction and is connected to the rear end of a slide 37 disposed horizontally above the front member 2 and provided at opposite ends with depending leg portions 38 mounted to slide upon the front member 2 towards and away from the camera box. Any suitable cord tightening means, such as a turn buckle, not shown, may be provided for taking up slack in the cord 35. A convenient location for a cord tightener would be at the rear end of the slide 37, where a turn buckle connection between cord 35 and the slide 37 would serve not only to connect the parts but would also provide adjustable means for taking up slack in the cord. The under face of the slide 37 is toothed or provided with a rack 39 meshing with the top side of a gear or pinion 40 carried by a horizontal shaft 41 mounted for rotation upon the front member 2 and having one end projected beyond the adjacent longitudinal edge of the front member 2 and provided with a knob or finger piece 42 for use in rotating the shaft. It will now be understood that the shaft 41 may be rotated so as to move the slide 37 outwardly from the camera box and thereby pull downwardly upon the cord 35 and thus rotate the cam 32 which in turn will swing the crank arm 31 and thereby rotate the shaft 25 and cause swinging movements of the sighting tubes 6 and 7 in the manner hereinbefore described.

In any range finding operation the amount of swing or pivotal movement of the sighting tubes 6 and 7 depends upon the spaced relation of the tubes. In other words, the closer together the tubes, the less swinging movement will be required to intersect the sight lines of the tube on the object. To provide for the proper swinging movement of the tubes, the crank arm 31 must occupy a predetermined position on the cam with respect to the length thereof and in accordance with the spaced relation of the sighting tubes. When the crank arm is at the larger end of the cam, the latter will impart the maximum movement to the crank arm. The swinging movement of the crank arm will decrease progressively as the position of the arm is shifted towards the smaller end of the cam. To automatically set the crank arm 31 to its proper position longitudinally of the cam 32 in accordance with the spaced relation of the tubes 6 and 7, a nut 43 is provided on a threaded portion of the shaft 17, and this nut is provided in one edge with an upright groove 44 constituting a seat receiving a peripheral portion of the enlarged and preferably circular or segmental head 45 at the upper end of the crank arm 31 and through which the shaft 25 passes.

The head 45 prevents rotation of the nut 43 on the shaft 17, so that when the shaft is rotated, the nut is fed along the shaft and moves the crank arm 31 along the shaft 25 until it comes to rest at the proper position along the cam 32 when the rotation of the shaft 17 has been stopped with the sighting tubes 6 and 7 in their proper spaced relation. Accordingly, it will be understood that the act of adjustably spacing the sighting tubes automatically moves the crank arm 31 along the shaft 25 to its proper cooperative position longitudinally of the cam 30 for subsequently pivotally swinging the sighting tubes, when the shaft 25 is turned by the action of the cam against the crank arm under the control of the finger piece 42 to intersect the tube sight lines on the object to be photographed.

The shaft 41 employed for adjustably swinging the sighting tubes 6 and 7 to intersect the sight lines on the subject to be photographed, is also employed for moving the lens mechanism 5 for focusing the camera, and for this purpose is extended beneath the bellows 4 and provided with a pinion 46 in mesh with a toothed rack 47 associated with the lens mechanism 5 so that upon manipulation of the finger piece 42 to turn the shaft 41 and thereby swing or turn the sighting tubes, as hereinbefore described, the pinion 46 will simultaneously operate to proportionately move the lens mechanism 5 and set it at the proper distance from the position of the photographically sensitive member in the camera box. Thus, it will be understood that the sighting tubes are used as a view finder and a view framer and that the hand manipulation of the piece 42 in setting the movable camera lens mechanism for focusing purposes while the operator continues to look through the sighting tubes. This obviates the necessity of shifting the sight of the operator from the object to be photographed in order to focus the camera.

The sighting tubes are provided with any suitable or preferred lens system such as a concave lens 48 at the front and a convex lens at the rear of the tube so as to provide a stereoscopic effect whereby the image of the object to be photographed will appear as one object to the person looking through said tubes when the tubes have been spaced to the spacing of the eyes of the operator and have been turned on their pivots until their longitudinal sight lines intersect on the object to be photographed.

Figures 3, 4, 5:
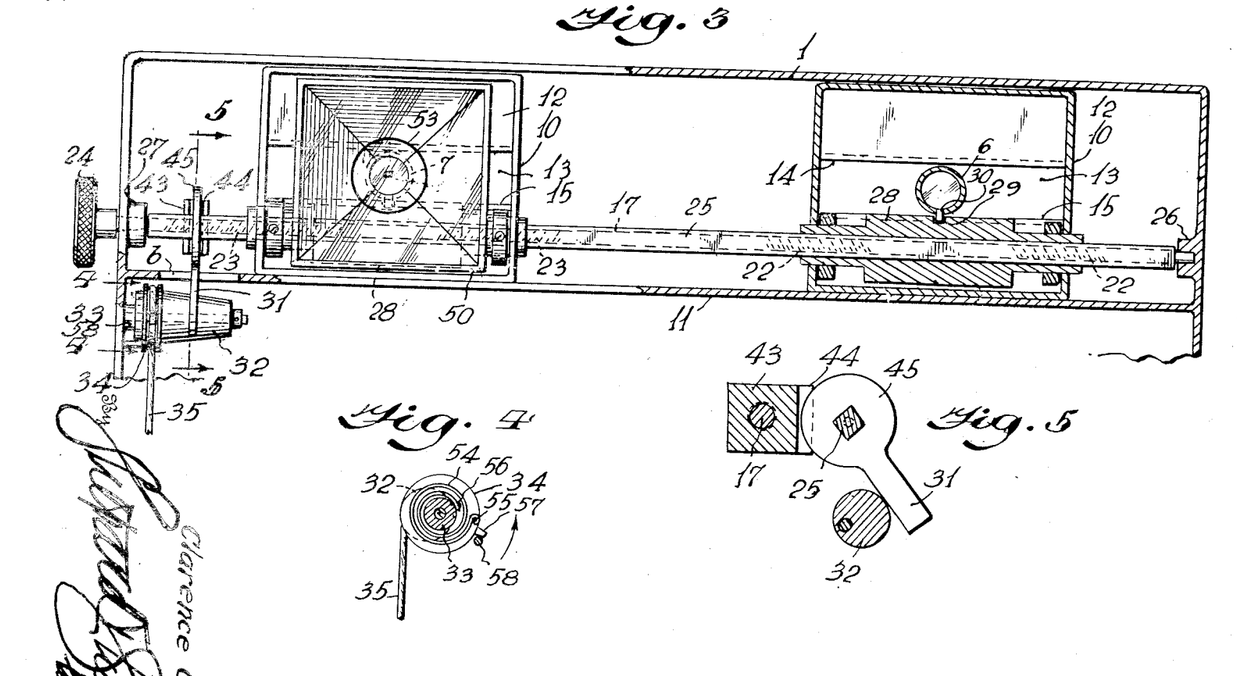
Figure 3 is a detail cross sectional view on the line 3—3 of Figure 2.
Figure 4 is a detail sectional view on the line 4—4 of Figure 3.
Figure 5 is a detail fragmentary sectional view on the line 5—5 of Figure 3.
Figure 6:
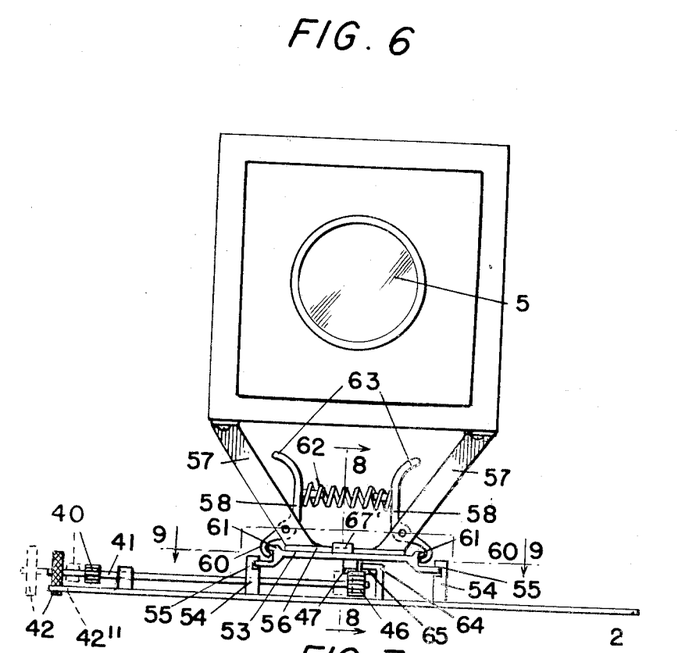
Figure 6 is a front elevation showing the mounting of the lens mechanism on the door of the camera.

To assist the operator in accurately adjusting the sight tubes for focusing purposes and to eliminate the personal equation or judgment of the operator, each tube is provided at its front with a flared or enlarged portion 50 together with a transparent plate 51 at the front open end of the flared portion 50. Each transparent plate 51 is provided with suitable markings or indices. When these markings appear as though brought together, merged or registered, the sight lines of the tubes are then intersected on the object to be photographed, and this condition indicates that the camera is in focus. Any suitable or preferred form of markings on plates 51 may be employed. For instance, as shown in Figure 3, one of the markings 53 may be a circle, and the other, not shown, may be a dot. In using these markings, the sighting tubes are swung on their pivots until the dot appears at the center of the circle and these markings also appear as being on the object, in which condition the registered marks indicate that the camera lens mechanism has been properly set for the distance to the subject to be photographed and the camera is in focus.

The flared portions 50 of the sighting tubes are employed for view framing purposes. When the desired view has been brought into vision through the sighting tubes, the view has been found, and then by proper manipulation of the camera box, the view may be selectively disposed within the frame provided by the walls of the flared portions of the tubes which, of course, produce the effect of a single frame due to the stereoscopic effect of the sighting tubes. While the flared portions may be of any form in cross section, a rectangular cross section is preferred for the reason that a view can most conveniently and accurately be disposed in the desired position within a rectangular frame as the straight sides of the frame afford the most convenient shape with which to align, dispose or center the view and thus frame it.

As shown in Figure 1 of the drawing, the sighting tubes are located above the bellows and the lens mechanism. Obviously, they could be located below the bellows and lens mechanism and function properly in this position. However, there is a necessary relation of the sighting tubes with respect to the camera lens, and this relation is that of being disposed equally on opposite sides of a plane located between the tubes, disposed at right angles to the plane of the tubes, and passing through the axes of the lens, so that the sight lines of the tubes may intersect in such plane. The bellows, the photographically sensitized member, and perhaps other parts of the camera, prevent the locating of the sighting tubes between the top and bottom of the camera box and in the same horizontal plane with the axis of the lens. For convenience of expression in the claims, the relation of the tubes and the lens will be expressed as that of the tubes being disposed equally at opposite sides of the axis of the camera lens. Inasmuch as the carriages 10, upon which the tubes are mounted, are always moved equally in opposite directions when setting or spacing the tubes to the distance between the eyes of the operator or user of the camera, this important relation of the tubes and lens is preserved. Also the turning or tilting of the tubes upon their pivotal mountings is to the same degree or angle for one tube as for the other, and thus the relative positions of tubes and lens axis is always preserved.

For moving the lens mechanism 5 for focusing the camera, I utilize the shaft 41 also employed for adjustably swinging the sighting tubes 6 and 7. Reference is made to Figs. 6–9, inclusive, for an understanding of this feature of the present invention. The shaft 41 is extended beneath the bellows 4 and provided with a pinion 46 meshed with the under side of a toothed rack 47 provided on the under side of a carriage 53 in the nature of a flat plate, the longitudinal edge portions of which are slidably supported on guideways 54 carried by the door 2 and provided on their inner faces with longitudinal grooves 55 slidably receiving the longitudinal edges of the carriage 53. It will thus be seen that the members 54 constitute a track having slideways 55 receiving the edges of the carriage 53. The lens mechanism 5 of the camera is provided with a base or crossbar 56 suspended from the lens mechanism by downwardly converged hangers or brackets 57, and the base or crossbar 56 is slidably supported upon the carriage 53. The base member 56 is separate from the carriage and may be clamped to the carriage 53 so as to move therewith. Suitable mechanism for this purpose includes a pair of upright clamp members 58 pivoted at 59 to the respective brackets or hangers 57. In the drawings, these clamp members 58 are pivoted to the rear sides of the hangers or brackets 57, but may be located in front thereof as may be desired. The lower end of each clamp member is curved inwardly to form a hook 60 to embrace and engage beneath a horizontal flange 61 or edge portion of the carriage 53. A helical spring 62 is interposed between and exerts pressure outwardly in opposite directions against the upper finger portions 63 of the clamp members so as to hold the clamp in frictional engagement with the opposite edges of the carriage 53 and thus clamp the lens mechanism to the carriage 53 for movement therewith. By manipulating the shaft 41, the pinion 46 may be turned so as to move the rack 47 and the carriage 53 and the lens mechanism clamped thereto in either direction for focusing purposes.

To lock the carriage 53 in any adjusted position along the track 54, a locking bracket 64 is provided on the inner face of the door 2 and has a laterally projecting flange 65 provided on its under side with a tooth or teeth with which the teeth of the pinion 46 may be engaged by thrusting the shaft 41 longitudinally inward, the shaft being mounted to permit such manipulation thereof. When the pinion 46 is thus engaged with the ribs or projections of the bracket 64, it is locked against being turned and at the same time being engaged with the teeth or ribs of the rack 47, the carriage 53 will be locked against accidental movement and therefore the lens mechanism may be held in any adjusted position. By pulling the shaft 41 outwardly, the pinion 46 may be disengaged from the bracket 64, and thus freed for turning and then by turning the shaft 41 the carriage and the lens mechanism, clamped thereto by the clamp members 58, may be moved towards or away from the camera box.

By pressing inwardly in opposite directions on the handles or finger pieces 63 of the clamp members 58, the latter may be disengaged from the carriage 53 so as to permit of the lens mechanism being moved by hand along the carriage 53 and pushed back into the camera box. During this operation the shaft 41 should be at its inner limit in engagement with the rack 47 and the bracket 64 so as to be in locked position to prevent movement of the carriage 53. There is provided within the camera box a keeper 66, in the form of a flat plate disposed in alignment with the carriage 53 in the open position of the door or front 2, so that the clamp jaws 60 may be slidably moved from the carriage to opposite edges of the keeper in the rearmost position of the carriage, each jaw being of a length to bridge the space between the adjacent ends of the carriage and keeper when being moved in either direction across the space between the carriage and keeper. It is not necessary to entirely disengage the jaws of the clamps from the edges of the carriage 53 to permit sliding of the base member 56 thereon and thus the jaws 60 will effectively guide the base member in moving to and from the parts 53 and 66.

With the bellows and lens mechanism within the camera box and the front or door 2 closed, the clamping jaws 60 are engaged with opposite sides of the keeper 66 so as to hold the bellows collapsed and also prevent shaking of the lens mechanism. It will be, of course, understood, in the closed condition of the camera, the carriage 53 will be at its rear or inner limit having been moved to that position by manipulation of the knob 42 and stopped in this position by having its rear end engaged with the closed rear end 67

(see Figure 10) of each groove or slideway 55. When the carriage 53 is stopped at its rear limit, the shaft 41 is pushed inwardly so as to engage not only the rack 47 but the tooth or teeth on the lock bracket 64 so as to hold the carriage in its initial rearmost position.

Figures 8, 9, 10:
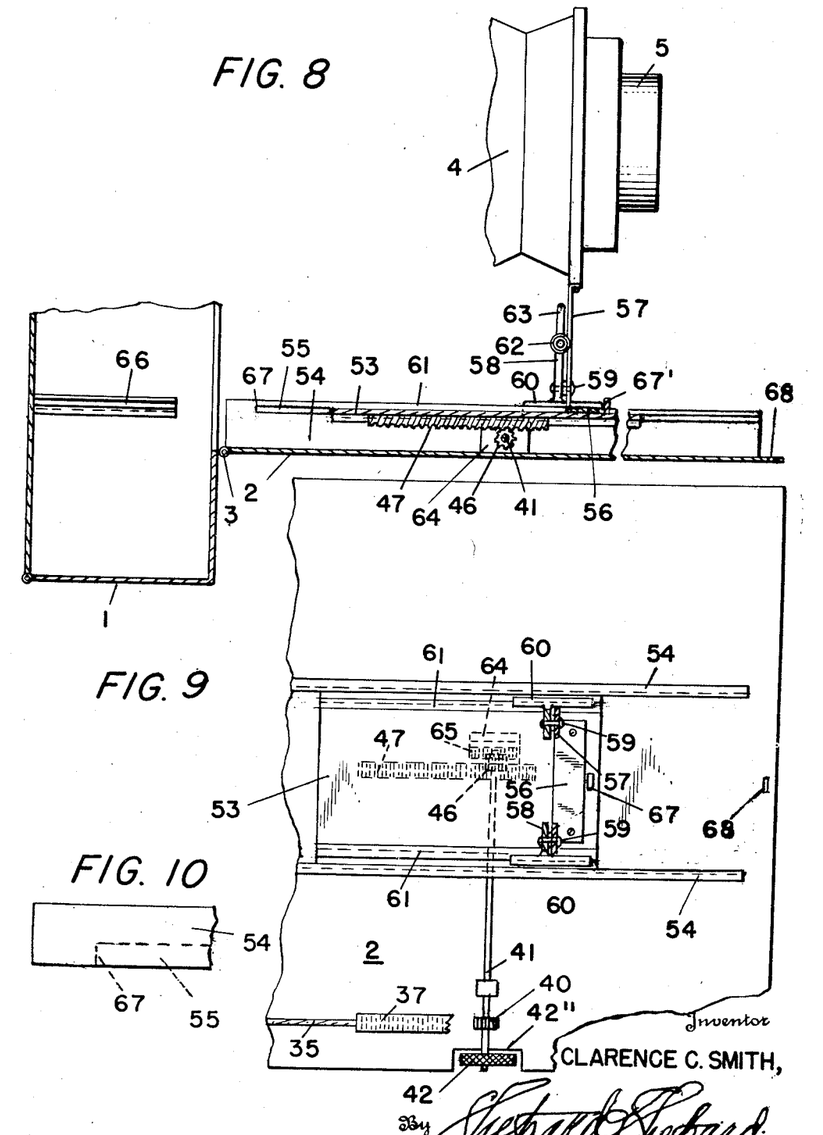
Figure 8 is a verticle longitudinal sectional view of Figure 6.
Figure 9 is a plan sectional view on the line 9—9 of Figure 6.
Figure 10 is a detail fragmentary sectional view illustrating the rear stop for the lens carriage.

In the closed condition of the camera, the outer end portion of the shaft 41 may be received in a notch 42' shown in Fig. 1, or, as shown in Fig. 9, the knob 42 may be received in a notch 42' in the adjacent edge of the door, thereby to permit of the door being closed without interference by the shaft 41 and the knob 42.

To put the camera in condition for use, the front or door 2 is opened until the carriage 53 is in alignment with the keeper 66. Then the handles or finger pieces 63 of the clamp are pressed inwardly to release the grip of the clamping jaws 60 upon the edges of the keeper 66, whereupon, by pulling forwardly on the fingerpieces 63, the lens mechanism and the bellows may be pulled out of the camera box, the jaws 60 sliding readily from the keeper to the carriage and then along the carriage until automatically brought to a stop by reason of the base bar 56 coming into contact with a stop shoulder 67' rising from the front of the carriage 53. It will be understood that during such operation, the carriage is held fixed by the pinion 46 engaging both the rack 47 on the carriage and the holding bracket 64. When the lens mechanism has been pulled out to its limit on the carriage 53, i. e. as far as the stop 67' thereon will permit, the camera will be set for "infinity focus," i. e. focused on objects 100 feet or more in front of the camera. This initial position of the lens mechanism is the starting point for focusing on nearer objects, for which the lens must be moved further away from the sensitized plate or film, by pulling the shaft 41 outwardly to disengage the pinion 46 from the keeper 64, and then manipulating the knob 42 to turn the shaft and pinion so as to move the carriage 53, and the lens mechanism secured thereto by the clamps 58, forwardly while at the same time looking through the sighting tubes, which are being swung inwardly by the manipulation of the shaft 41 and the connections therefrom to the tubes. It will thus be understood that by the manipulation of a single member, i. e. the handle, fingerpiece or knob 42, the camera is focused, while the operator is looking through the sighting tubes and without requiring the operator to shift his eyes from the sighting tubes.

Figure 7:
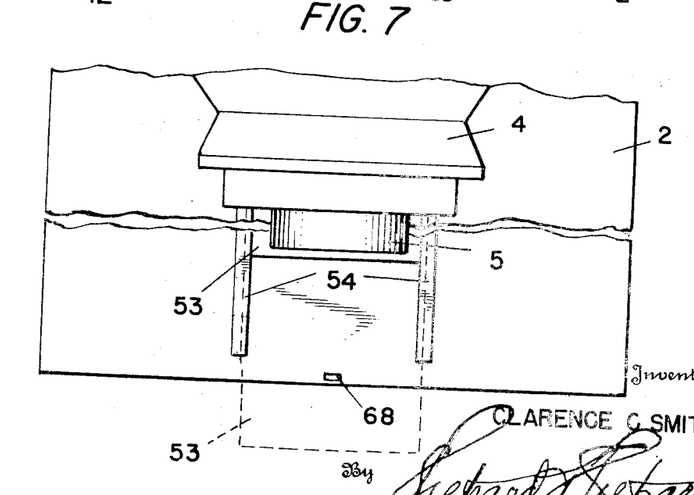
Figure 7 is a plan view of Figure 6.

As indicated in Figs. 7 and 9 the door 2 has one member 68, of latching means for holding the door closed, such member being located on the inner face of the door and at the outer end thereof. It will be remembered that the carriage 53 is moved to its rear limit preparatory to closing the door, and in this position the front end edge of the carriage lies in rear of such latching member in the closed condition of the camera so as not to interfere with the function of the latching member in locking the door.

The sighting tubes and associated mechanism are set at the factory with respect to the position of the lens mechanism when the latter is at "infinity focus." Thereafter the lens mechanism will be moved for focusing purposes by and in accordance with the adjustment or manipulation of the sighting tubes to intersect their sight lines on the subject to be photographed. The procedure for setting the mechanism is as follows:

The camera door 2 is opened to its limit as shown in Figures 1, 2, 8 and 9. Then, by manipulation of the finger portion 63 of the clamping means, the lens mechanism is released from the keeper 66 in the camera box and then pulled out upon and along the carriage 53 until arrested by the stop 67' on the carriage. This is the position of the lens mechanism when at "infinity focus" or in other words, set for photographing an object substantially 100 feet in front of the camera. This is in accordance with standard practice and requires no further explanation, except to state that when the door 2 is closed, the carriage 53 is at its rear limit and is locked in that position by the engagement of the pinion 46 with the keeper 65 and the rack 47 on the bottom of the carriage, which assures that the stop 67' will be in the position to halt the forward or outward movement of the lens mechanism at "infinity focus" when the lens mechanism is being drawn forwardly on the carriage. With the lens mechanism at "infinity focus," the person who is adjusting the camera will first look through the sighting tubes 6 and 7 and adjust the spacing thereof to the spacing of his eyes by manipulation of the finger piece 24, which moves the crank arm 31 to its proper position longitudinally of the cam 32. Continuing to look through the sighting tubes and at an object at or slightly more than 100 feet away from the camera, the tubes 6 and 7 are swung on their pivots 16 until the sight lines of the tubes intersect on the said object as indicated by the markings on the transparent plates 51 of the tubes which are now in registration or in some predetermined relation and appearing as upon the object to be photographed. This is the proper position of the sighting tubes when the lens mechanism is set at "infinity focus," because the sight lines of the tubes now form an isosceles triangle having as its base the imaginary line between the eyes of the adjuster, the altitude of such triangle being the distance to the object to be photographed. The tubes 6 and 7 may be swung on their pivots by pulling downwardly on the cord 35, thereby rotating the cam 32 which in turn swings the crank arm 31, thereby rotating the shaft 25 on which are the parts 28 having the cam grooves 29 in which work the pins 30 carried by the sighting tubes and by which the sighting tubes are swung on their pivots 16. During this adjustment of the sighting tubes, the lens mechanism is held fixed at "infinity focus" because the pinion 46 engages the rack 47 and the keeper 65, and therefore the sighting tubes are set properly in accordance with the position of the lens mechanism to photograph the object on which the sight lines intersect at about 100 feet in front of the lens. The cord 35 should be provided with some kind of cord tightening means, as for instance, a turn-buckle connection or other adjustable connection, say between the cord and the rear end of the rack 37, such cord tightener being employed to tighten the cord after the sighting tubes have been adjusted as above described.

What is claimed is:

1. In a photographic camera, the combination of settable lens mechanism, view-finding focusing means including a pair of sighting tubes, a carriage for each sighting tube, each sighting tube being pivotally mounted on its carriage, a rotatable carriage-shaft mounted upon the camera, nuts carried by the carriages and receiving the shaft, the shaft being provided with screw-threaded portions engaging the nuts, one screw-threaded portion being reverse to that of the other screw-threaded portion for moving the carriages towards and away from one another for adjustably spacing the tubes, a rotatable sighting tube shaft extending through the carriages, a cylinder for each carriage and mounted to rotate with and slide upon the sighting-tube shaft, each cylinder having a cam groove, each sighting tube having a pin in the cam groove of the adjacent cylinder for swinging the tube on its pivot, a crank arm rotatable with and slidable upon the sighting-tube shaft for rotating the said shaft, a rotatable cam associated with the crank arm for swinging the same, means on the carriage shaft for adjustably moving the crank arm along the cam to correlate the swinging of the arm to the spacing of the tubes, a pulley for the cam, a cord connected to and trained around the pulley, a shaft having a gear, a rack connected with the lens mechanism and associated with the gear, and a slidable rack associated with a gear on the last mentioned shaft, the cord being connected to said slidable rack.

2. In a camera, the combination with lens mechanism adjustable for focusing purposes, a pair of sight tubes pivotally mounted on the camera for range finding purposes, means for selectively spacing the pivotal mountings of the tubes, means for pivotally adjusting the tubes on their mountings to intersect their sight lines, means to co-relate such pivotal adjusting means to the spacing of the tubes, and means actuated by the tube adjusting means for simultaneously moving the lens mechanism for focusing purposes while looking through the tubes.

3. A camera having lens mechanism movable for focusing purposes, a pair of pivotally mounted sight tubes, means for adjustably spacing the tubes including a rotatable spacing shaft, means for adjustably turning the tubes on their pivotal mountings to intersect their sight lines including a rotatable tube adjusting shaft, the two shafts being parallel, the means for turning the tube adjusting shaft including a conical cam rotatable on its longitudinal axis disposed parallel with the tube adjusting shaft, a crank arm carried by the tube adjusting shaft for rotating the same and slidable thereon and lying against the periphery of the cam whereby rotation of the cam will swing the crank arm and rotate the tube adjusting shaft, means actuated by the tube spacing shaft for moving the crank arm along the cam in accordance with the spacing of the tube whereby to co-relate pivotal adjustment of the tubes to the spacing thereof, a handle connected with the cam for rotating the cam, and means connected to the handle and the lens for moving the lens to focusing position by the movement of the handle for pivotal adjustment of the tubes for range finding while looking through the tube.

4. A camera having lens mechanism movable for focusing purposes, a pair of carriages mounted upon the camera and movable towards and away from each other, a rotatable carriage spacing shaft mounted on the camera and connected with the carriages for adjustably moving them by the rotation of the shaft, sight tubes located in the same plane and pivotally mounted upon the carriages for pivotal movement towards and away from one another, a rotatable tube adjusting shaft mounted on the camera in parallelism with the carriage spacing shaft and connected with the tubes for pivotally adjusting the same, a traveling nut mounted on the carriage adjusting shaft, a tapered cam rotatably mounted on its longitudinal axis parallel with the tube adjusting shaft, a crank arm slidable upon the tube adjusting shaft and rotatable therewith, said crank arm bearing upon said cam and connected to the nut and movable with the nut longitudinally of the cam, a handle, means extending between the handle and the cam for rotating the latter to swing the crank arm and rotate the tube adjusting shaft and thereby pivotally adjust the tubes, and other means extending between the handle and the lens for moving said lens for focusing the same by the movement of the handle in rotating the cam while looking through the tubes.

CLARENCE C. SMITH.

REFERENCES CITED

The following references are of record in the file of this patent:

UNITED STATES PATENTS

| Number | Name | Date |
| --- | --- | --- |
| 767,847 | Stewart | Aug. 16, 1904 |
| 926,912 | Vogt et al. | July 6, 1909 |
| 1,178,474 | Becker | Apr. 4, 1916 |
| 1,267,323 | Kleidman | May 21, 1918 |
| 1,272,214 | Camus | July 9, 1918 |
| 1,662,125 | Oscanyan | Mar. 13, 1928 |
| 2,180,236 | Heinisch | Nov. 14, 1939 |
| 2,202,593 | Moreau et al. | May 28, 1940 |
| 2,337,463 | Hall | Dec. 21, 1943 |
| 2,358,093 | Luboshez | Sept. 12, 1944 |
| 2,364,557 | Stevenson | Dec. 5, 1944 |

FOREIGN PATENTS

| Number | Country | Date |
| --- | --- | --- |
| 342,230 | France | July 2, 1904 |
| 416,091 | France | July 29, 1910 |